United States Patent
Choi et al.

(10) Patent No.: US 11,823,682 B2
(45) Date of Patent: *Nov. 21, 2023

(54) DISPLAY APPARATUS CAPABLE OF RELEASING A VOICE INPUT MODE BY SENSING A SPEECH FINISH AND VOICE CONTROL METHOD THEREOF

(71) Applicant: SAMSUNG ELECTRONICS CO., LTD., Suwon-si (KR)

(72) Inventors: Sung-wook Choi, Seoul (KR); Hee-seob Ryu, Hwaseong-si (KR); Hee-ran Lee, Suwon-si (KR); Sung-pil Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 386 days.

This patent is subject to a terminal disclaimer.

(21) Appl. No.: 16/894,271

(22) Filed: Jun. 5, 2020

(65) Prior Publication Data
US 2020/0302935 A1    Sep. 24, 2020

Related U.S. Application Data

(63) Continuation of application No. 16/514,028, filed on Jul. 17, 2019, now Pat. No. 10,720,162, which is a
(Continued)

(30) Foreign Application Priority Data

Oct. 14, 2013 (KR) .................. 10-2013-0122131

(51) Int. Cl.
*G10L 15/28*   (2013.01)
*G10L 15/22*   (2006.01)
*G10L 25/78*   (2013.01)

(52) U.S. Cl.
CPC .............. *G10L 15/28* (2013.01); *G10L 15/22* (2013.01); *G10L 25/78* (2013.01)

(58) Field of Classification Search
CPC .......... G10L 15/28; G10L 15/22; G10L 25/28
See application file for complete search history.

(56) References Cited

U.S. PATENT DOCUMENTS 6,212,408 B1 *   4/2001   Son ...................... H04M 1/271
                                                     455/565
6,397,181 B1 *   5/2002   Li ........................... G10L 15/08
                                                     704/256.4
(Continued)

FOREIGN PATENT DOCUMENTS

JP         2011118822 A     6/2011
KR    10-2006-0007148 A     1/2006
(Continued)

OTHER PUBLICATIONS

Communication dated Feb. 18, 2020 issued by the Korean Intellectual Property Office in KR Application No. 10-2013-0122131.
(Continued)

*Primary Examiner* — Kevin Ky
(74) *Attorney, Agent, or Firm* — Sughrue Mion, PLLC (57) ABSTRACT

A voice control method and display apparatus are provided. The voice control method includes converting a voice of a user into text in response to the voice being input during a voice input mode; performing a control operation corresponding to the text; determining whether speech of the user has finished based on a result of the performing the control operation; awaiting input of a subsequent voice of the user during a predetermined standby time in response to determining that the speech of the user has not finished; and releasing the voice input mode in response to determining that the speech of the user has finished.

22 Claims, 9 Drawing Sheets

Related U.S. Application Data continuation of application No. 16/166,898, filed on Oct. 22, 2018, now Pat. No. 10,395,657, which is a continuation of application No. 14/267,510, filed on May 1, 2014, now Pat. No. 10,140,990.

(56) References Cited

U.S. PATENT DOCUMENTS

| | | | |
|---|---|---|---|
| 6,415,258 B1* | 7/2002 | Reynar | G06F 3/167 704/E15.04 |
| 6,456,976 B1* | 9/2002 | Kuita | H04M 1/673 704/275 |
| 6,947,894 B1* | 9/2005 | Engstrom | G06F 1/3231 704/274 |
| 9,123,339 B1* | 9/2015 | Shaw | G10L 15/22 |
| 9,684,697 B1* | 6/2017 | Panda | G06F 16/248 |
| 10,140,990 B2* | 11/2018 | Choi | G10L 15/28 |
| 10,395,657 B2* | 8/2019 | Choi | G10L 15/28 |
| 10,720,162 B2* | 7/2020 | Choi | G10L 15/28 |
| 2004/0143374 A1* | 7/2004 | Horst | B61L 3/127 701/19 |
| 2007/0219805 A1* | 9/2007 | Nomura | G10L 15/22 704/E15.04 |
| 2008/0114603 A1* | 5/2008 | Desrochers | G10L 15/22 704/E15.04 |
| 2009/0112593 A1* | 4/2009 | Konig | G06F 16/2423 704/251 |
| 2010/0250243 A1 | 9/2010 | Schalk et al. | |
| 2010/0312547 A1* | 12/2010 | Van Os | G06F 3/167 704/E15.04 |
| 2011/0178804 A1* | 7/2011 | Inoue | G10L 15/26 704/E11.001 |
| 2011/0288868 A1* | 11/2011 | Lloyd | G10L 15/22 704/E15.001 |
| 2012/0034904 A1* | 2/2012 | LeBeau | H04W 4/046 455/414.1 |
| 2013/0033422 A1 | 2/2013 | Choi et al. | |
| 2013/0033428 A1 | 2/2013 | Choi et al. | |
| 2013/0218573 A1 | 8/2013 | Cheng et al. | |
| 2013/0219032 A1* | 8/2013 | Hsu | H04W 52/0274 709/222 |
| 2013/0219277 A1* | 8/2013 | Wang | G06F 3/167 715/728 |
| 2013/0268956 A1* | 10/2013 | Recco | G06Q 30/02 725/13 |
| 2013/0346867 A1* | 12/2013 | Woods | G11B 27/34 715/728 |
| 2014/0006022 A1 | 1/2014 | Yoon et al. | |
| 2014/0136213 A1* | 5/2014 | Kim | G06F 16/489 704/275 |
| 2014/0156256 A1* | 6/2014 | Kim | G06F 40/58 704/2 |
| 2014/0181865 A1* | 6/2014 | Koganei | H04N 21/4312 725/38 |
| 2014/0183034 A1* | 7/2014 | Noh | C23C 14/35 204/192.12 |
| 2014/0267933 A1 | 9/2014 | Young | |
| 2015/0199965 A1* | 7/2015 | Leak | G10L 15/22 704/249 |
| 2020/0302935 A1* | 9/2020 | Choi | G10L 15/28 |
| 2022/0189457 A1* | 6/2022 | Shen | G10L 15/22 |

FOREIGN PATENT DOCUMENTS

| | | |
|---|---|---|
| KR | 1020130016024 A | 2/2013 |
| KR | 101309794 B1 | 9/2013 |

OTHER PUBLICATIONS

Communication dated Oct. 30, 2020 issued by the Korean Intellectual Property Office in Korean Application No. 10-2020-0118473.
Communication dated Apr. 27, 2021 issued by the Korean Intellectual Property Office in Korean Application No. 10-2021-0043182.
Communication dated Aug. 18, 2021 issued by the Korean Intellectual Property Office in Korean Patent Application No. 10-2021-0043182.
Communication dated Jul. 21, 2022 issued by the Korean Intellectual Property Office in Korean Patent Application No. 10-2022-0084014.

* cited by examiner

DISPLAY APPARATUS CAPABLE OF RELEASING A VOICE INPUT MODE BY SENSING A SPEECH FINISH AND VOICE CONTROL METHOD THEREOF

CROSS-REFERENCE TO RELATED APPLICATIONS

This application is a Continuation Application of U.S. application Ser. No. 16/514,028, filed on Jul. 17, 2019, which is a Continuation Application of U.S. application Ser. No. 16/166,898, filed on Oct. 22, 2018, and issued as U.S. Pat. No. 10,395,657 on Aug. 27, 2019, which is a Continuation Application of U.S. application Ser. No. 14/267,510, filed on May 1, 2014, and issued as U.S. Pat. No. 10,140,990 on Nov. 27, 2018, which claims priority from Korean Patent Application No. 10-2013-0122131, filed on Oct. 14, 2013, in the Korean Intellectual Property Office, the disclosures of which are incorporated herein by reference in their entirety.

BACKGROUND

Field

Apparatuses and methods consistent with the exemplary embodiments relate to a display apparatus and a voice control method thereof, and more particularly, to a display apparatus capable of releasing a voice input mode by sensing a speech finish time of a user, and a voice control method thereof.

Description of the Related Art

Due to the development of electronic technology, diverse types of electronic devices have been developed and have become widespread. Also, diverse functions of electronic devices have been provided.

Accordingly, efforts have continued to develop interaction technology that enables users to use electronic devices more conveniently. One of them is voice control technology which performs control operations using the user's voice.

Recently, diverse devices such as televisions, mobile phones, and navigation devices have been implemented with functionality to recognize the user's speech and to perform control operations corresponding to the speech.

However, there are several difficulties in applying voice control technology to devices and using the voice control technology in real life. For example, while the user is speaking to a device, ambient noise or conversation may inadvertently be input, thereby causing the device to malfunction.

Therefore, there is a need for a method of more efficiently and precisely performing voice control.

SUMMARY

Exemplary embodiments overcome the above disadvantages and other disadvantages not described above. Also, an exemplary embodiment is not required to overcome the disadvantages described above, and an exemplar) embodiment may not overcome any of the problems described above.

One or more exemplary embodiments provide a display apparatus capable of releasing a voice input mode by determining whether the user's speech has finished, and a voice control method thereof.

According to an aspect of an exemplary embodiment, there is provided a voice control method including converting a voice of a user into text in response to the voice being input during a voice input mode; performing a control operation corresponding to the text; determining whether speech of the user has finished based on a result of the performing the control operation; awaiting input of a subsequent voice of the user during a predetermined standby time in response to determining that the speech of the user has not finished; and releasing the voice input mode in response to determining that the speech of the user has finished.

In the determining operation, in response to an information selected in at least one search process performed in accordance with the voice of the user or the subsequent voice of the user being displayed, it may be determined that the user's speech has finished.

In the determining operation, in response to a multimedia content being reproduced, a determination may be made that the speech of the user has finished.

The voice control method may further include displaying a graphic object corresponding to the voice input mode while the voice input mode is maintained.

According to an aspect of another exemplary embodiment, there is provided a voice receiver configured to receive a voice of a user in a voice input mode; and a controller configured to perform a control operation corresponding to the voice of the user received by the voice receiver, wherein the controller is configured to determine whether speech of the user has finished based on a result of performing the control operation, await input of a subsequent voice of the user for a predetermined standby time in response to determining that the speech of the user has not finished, and release the voice input mode in response to determining that the speech of the user has finished The display apparatus may further include a display configured to display a graphic object corresponding to the voice input mode while the voice input mode is maintained.

In response to the voice of the user being input, the controller may display on one side of the graphic object, text corresponding to the voice of the user.

In response to the voice input mode being released, the controller may change the graphic object into a form which represents a release from the voice input mode.

The controller may perform at least one search in accordance with the voice of the user or the subsequent voice of the user, display search results on the display, and determine that the user's speech has finished in response to one of the search results being selected and information regarding the selected search result is displayed.

The controller may determine that the speech of the user finishes in response to the control operation being an operation to play back multimedia contents.

The display apparatus may further include a communicator configured to communicate with a voice recognition apparatus which converts the voice of the user into text. The controller may transmit the voice of the user to the voice recognition apparatus through the communicator and in response to the voice recognition apparatus converting the voice of the user into the text, the controller may receive the text and may perform the control operation which corresponds to the text.

The display apparatus may further include a communicator configured to communicate with a server apparatus which performs a search. The controller may transmit text corresponding to the voice of the user to the server apparatus, receive search results regarding the text from the server apparatus, and display the search results on the display, and in response to a speech finish signal being received from the server apparatus, the controller may determine that the user's speech has finished, and release the voice input mode.

The display apparatus may further include a communicator configured to communicate with a voice recognition apparatus which converts the user's voice into text and to communicate with a server apparatus which performs a search using the text.

The controller may transmit the voice of the user to the voice recognition apparatus, receive the text from the voice recognition apparatus, transmit the text to the server apparatus through the communicator, receive search results from the server apparatus, and display the search results on the display. In response to a speech finish signal being received from the server apparatus, the controller may determine that the user's speech has finished, and release the voice input mode.

According to an aspect of another exemplary embodiment, there is provided a server apparatus including a server communicator configured to receive text corresponding to a voice of the user from a display apparatus which operates in a voice input mode, a database configured to store contents information, a server controller configured to search the database for the received text, transmit searched contents information to the display apparatus, and transmit a speech finish signal to the display apparatus in response to a determination that the speech of the user has finished, based on the search results.

In the voice control system according to the exemplary embodiments, the voice input mode may be automatically released by determining whether the speech of the user has finished.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding. Thus, it is apparent that the exemplary embodiments can be carried out without those specifically defined matters. Also, well-known functions or constructions are not described in detail since they would obscure the exemplary embodiments with unnecessary detail.

Figure 1:
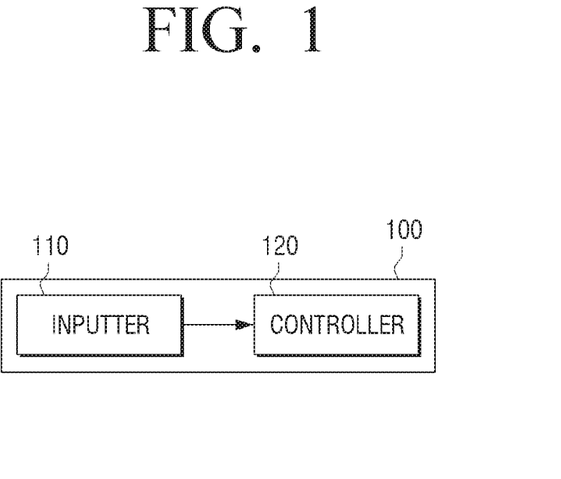
FIG. 1 is a block diagram of a configuration of a display apparatus according to an exemplary embodiment.

FIG. 1 is a block diagram of a configuration of a display apparatus according to an exemplary embodiment. With reference to FIG. 1, the display apparatus 100 may include a voice receiver 110, e.g., an inputter, and a controller 120.

The voice receiver 110 receives a voice of a user (user's voice). The voice receiver 110 may include a microphone to receive the user's voice directly or may receive the user's voice indirectly from a remote controller including a microphone.

The controller 120 performs a control operation corresponding to the user's voice input through the voice receiver 110. More specifically, in response to the user's command input to the voice receiver 110 being a predetermined voice command, the controller 120 may perform an operation corresponding to the voice command. For example, if the display apparatus 100 is a television, voice commands regarding diverse operations, such as "turn on" or "turn off", "turn up the volume" or "turn down the volume", and "change the channel" may be designated and stored. In response to such a voice command being input, the controller 120 performs operation matched to the voice command.

In response to the user's voice being text which is not predetermined, the controller 120 performs an operation corresponding to the text. In other words, the display apparatus 100 may analyze the user's voice and provide interactive service in response to the user's voice. For example, in response to the user saying "actor ABCD", the display apparatus 100 may search for diverse information, including the text "actor ABCD" and may display the result of the search.

The controller 120 may analyze the user's voice and convert the user's voice into text, by itself. Alternatively, in another exemplary embodiment, the user's voice may be transmitted to an external server apparatus (not shown), and the external server apparatus may convert the user's voice into text and transmit the text to the display apparatus 100. The server apparatus that converts voice into text may be referred to as a voice recognition apparatus, for purposes of convenience of description. The exemplary embodiment in which voice is converted into text by the voice recognition apparatus will be described later in greater detail. The controller 120 may enter a voice input mode by the user's selection. In the voice input mode, the controller 120 may activate the voice receiver 110 to receive the user's voice. After the user's voice is received and a corresponding control operation is performed, the controller 120 determines whether the user's speech has finished according to the result of the performed control operation. That is, the controller determines whether or not a speech finish state has occurred. The speech finish state refers to a state that is not expected to use voice control any longer.

That is, the controller 120 may determine whether the user's speech has finished, according to characteristics of the control operation performed based on the user's voice. For example, users usually speak to the display apparatus 100 to search for information or to execute a function that they want. Accordingly, when the information that the user wants is finally searched or when the function that the user wants is executed, the user may not speak during a predetermined period of time. In consideration of this feature, in response to the user selecting information in this information search process and thus the information is displayed, the controller 120 may determine that the user's speech has finished, e.g., that the user has finished speaking. In addition, in response to an application being executed or multimedia contents being reproduced, and thus an application screen or contents screen being displayed, the controller 120 may determine that the user's speech has finished.

As a result, in response to the controller 120 determining that the user's speech has finished, the controller 120 immediately releases or ends the voice input mode without waiting during a standby time. Therefore, the possibility of malfunction by ambient noise during the unnecessary standby time may be cut off.

However, in response to the controller 120 determining that the user's speech has not finished, the controller 120 awaits a user's subsequent speech during a predetermined standby time. In response to the user's subsequent speech being input during a predetermined standby time, the controller 120 performs a control operation in accordance with the user's subsequent speech, and determines again whether the user's speech has finished. In response to determining that the user's speech has not finished, the controller 120 resets the standby time and awaits a user's further speech during the new standby time.

In other words, once the voice input mode is selected, the controller 120 maintains the voice input mode until the user completes speaking, even when the voice input mode is not selected again. Accordingly, the user may not always select the voice input mode whenever voice control is needed.

In FIG. 1, the display apparatus 100 is described to perform voice control independently, but may perform voice control in line with an external server apparatus.

Figure 2:
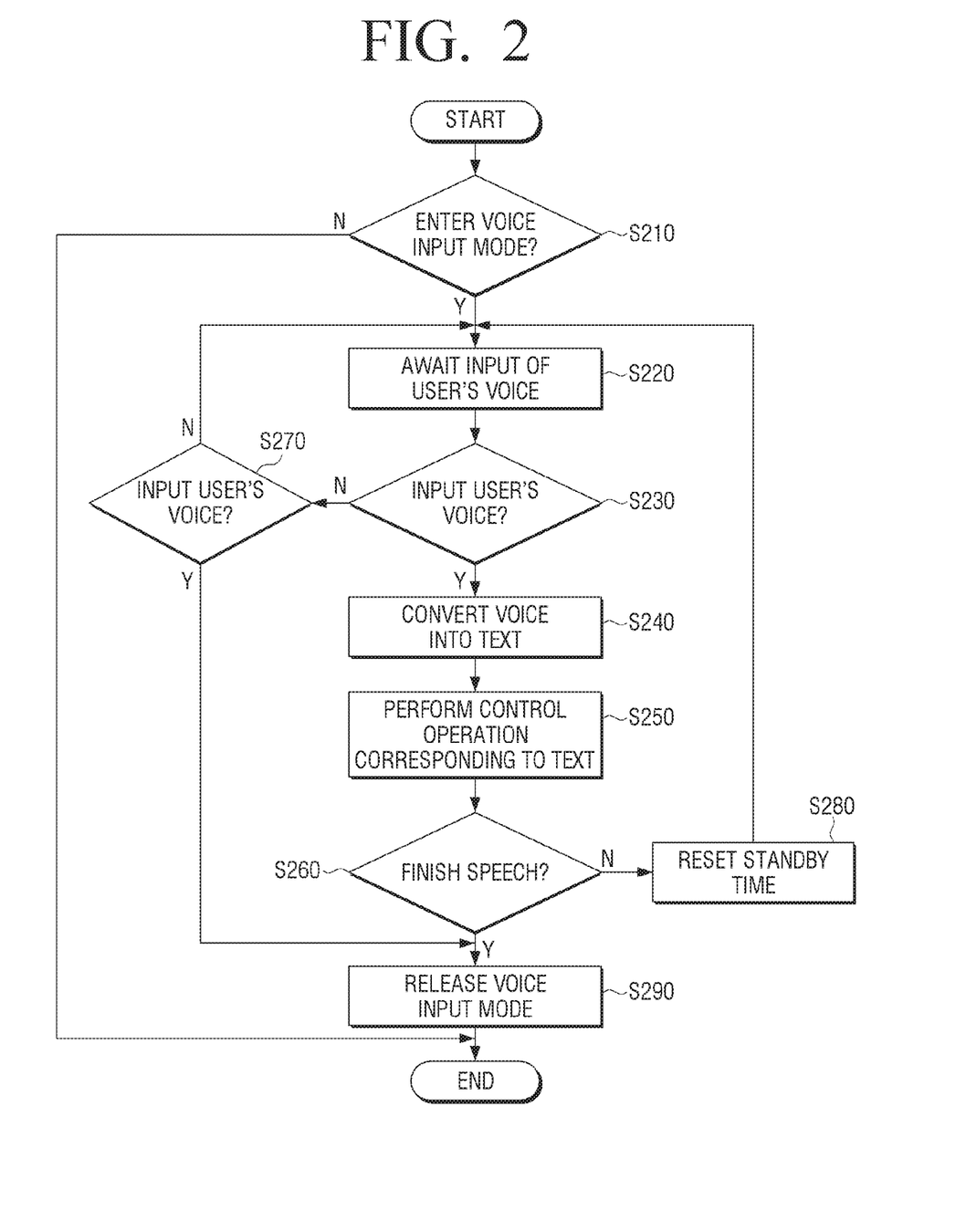
FIG. 2 is a flow chart of a voice control method according to an exemplary embodiment.

FIG. 2 is a flow chart of a voice control method according to an exemplary embodiment. With reference to FIG. 2, in response to the display apparatus 100 entering the voice input mode (S210), the display apparatus 100 awaits input of the user's voice (S220). As described above, the user's voice may be input through a microphone provided in a main body of the display apparatus 100 or may be input through a microphone provided in a remote controller, or in an external apparatus and be transmitted to the display apparatus 100.

In response to the user's voice being input (S230), the display apparatus 100 converts the voice into text (S240). Converting the voice into the text may be performed by the display apparatus 100. In another exemplary embodiment, in response to the display apparatus 100 transmitting the user's voice to an external server apparatus, that is, a voice recognition apparatus, the voice recognition may convert the user's voice into text and transmit the text to the display apparatus 100.

The display apparatus 100 performs a control operation corresponding to the text (S250). For example, in response to the user saying at least one keyword, the display apparatus 100 may search for diverse information which includes the keyword and display the search results. In addition, in response to the user saying at least one keyword and command, the display apparatus 100 may access an application corresponding to the command and input the keyword to the application. For example, in response to the user saying a name of contents and a command to play back the contents (for example, "play back" or "reproduce"), the display apparatus 100 runs a contents playback application and inputs the name of the contents to the contents playback application so that the contents corresponding to the name may be reproduced.

After performing the control operation, the display apparatus 100 determines whether the user has finished speech based on contents of the control operation (S260). This determination may be performed by the display apparatus 100 or may be performed by an external server apparatus and be transmitted to the display apparatus 100.

A method for determining whether the user's speech has finished may be implemented diversely. For example, in response to an information selected in at least one search process performed in accordance with the user's voice or the user's subsequent voice being displayed, it may finally be determined that the user's speech has finished.

Otherwise, in response to a multimedia content selected by the user's voice or subsequent voice being reproduced, it may be determined that the user's speech has finished.

Examples of the specific determination method will be described later with reference to the drawings.

In response to determining that the user's speech has finished, the display apparatus 100 releases or ends the voice input mode (S290). In response to the display apparatus 100 not being in the voice input mode, voice control cannot be performed until the user again selects the voice input mode.

In response to determining that the user's speech has not finished, the display apparatus 100 resets the standby time (S280), maintains the voice input mode during the standby time, and awaits the user's voice (S220). The standby time may be set by the manufacturer of the display apparatus 100 or by the user. For example, the standby time may be set to 30 seconds.

In response to the standby time having elapsed without input of the user's voice (S270), the display apparatus 100 may release the voice input mode.

Although not shown in FIG. 2, displaying a graphic object corresponding to the voice input mode during the voice input mode may be further included. The form and role of the graphic object will be described later, in detail.

Figure 3:
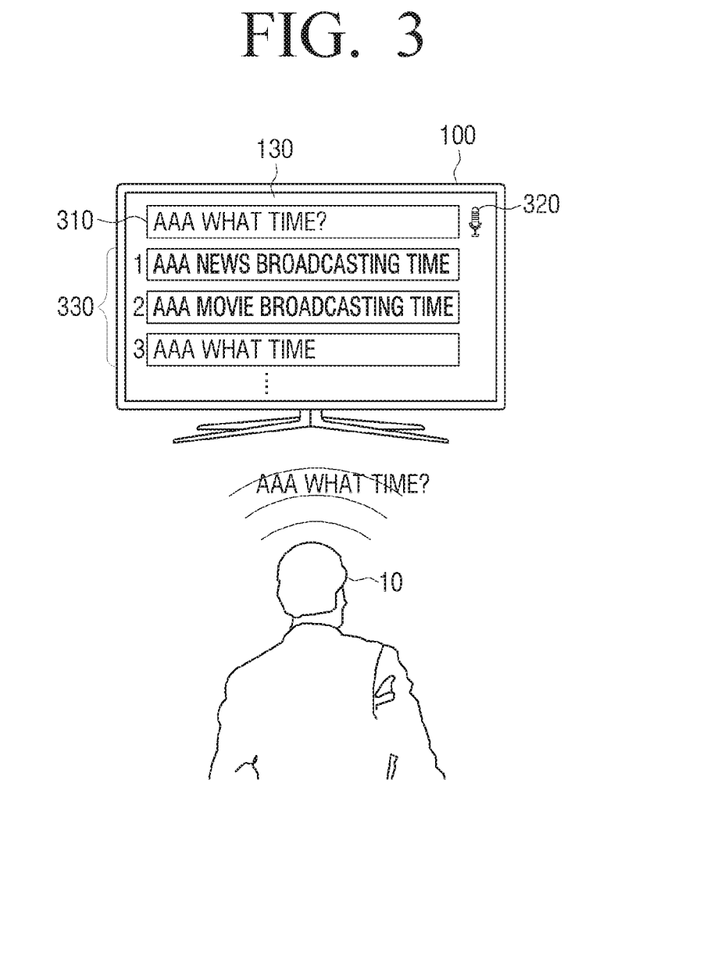
FIG. 3 illustrates a voice control process of the display apparatus.

FIG. 3 illustrates a voice control process of the display apparatus 100. With reference to FIG. 3, the display apparatus 100 may further include a display 130.

The display 130 may display contents selected by the user. In addition, in the voice input mode, the display 130 displays the graphic object 320 corresponding to the voice input mode. While the voice input mode is maintained, the graphic object 320 may be constantly displayed. In FIG. 3, the graphic object 320 of a microphone shape is displayed on one edge of the screen, but the shape and position of the graphic object 320 is not limited thereto.

In response to the user's voice being input, the controller 120 displays on the display 130 text corresponding to the user's voice. With reference to FIG. 3, a text display area 310 may be provided on one side of the graphic object 320. Accordingly, the text corresponding to the user's voice may be displayed in the text display area 310. The user may check whether the user's speech is correctly recognized by identifying the text displayed in the text display area 310.

Under the text display area 310, a result display area 330 is provided to display the results of the control operation corresponding to the user's voice. The controller 130 displays in the result display area 330 the results of the control operation corresponding to the user's voice.

FIG. 3 shows an example in which the user 10 says "AAA what time". In this case, the controller 120 searches using keywords "AAA" and "what time". The controller 120 displays the search results 330 in the result display area 330.

Based on the search results, the controller 120 determines whether the user's speech has finished. In response to determining that the user's speech has finished, the controller 120 releases the voice input mode.

Figure 4:
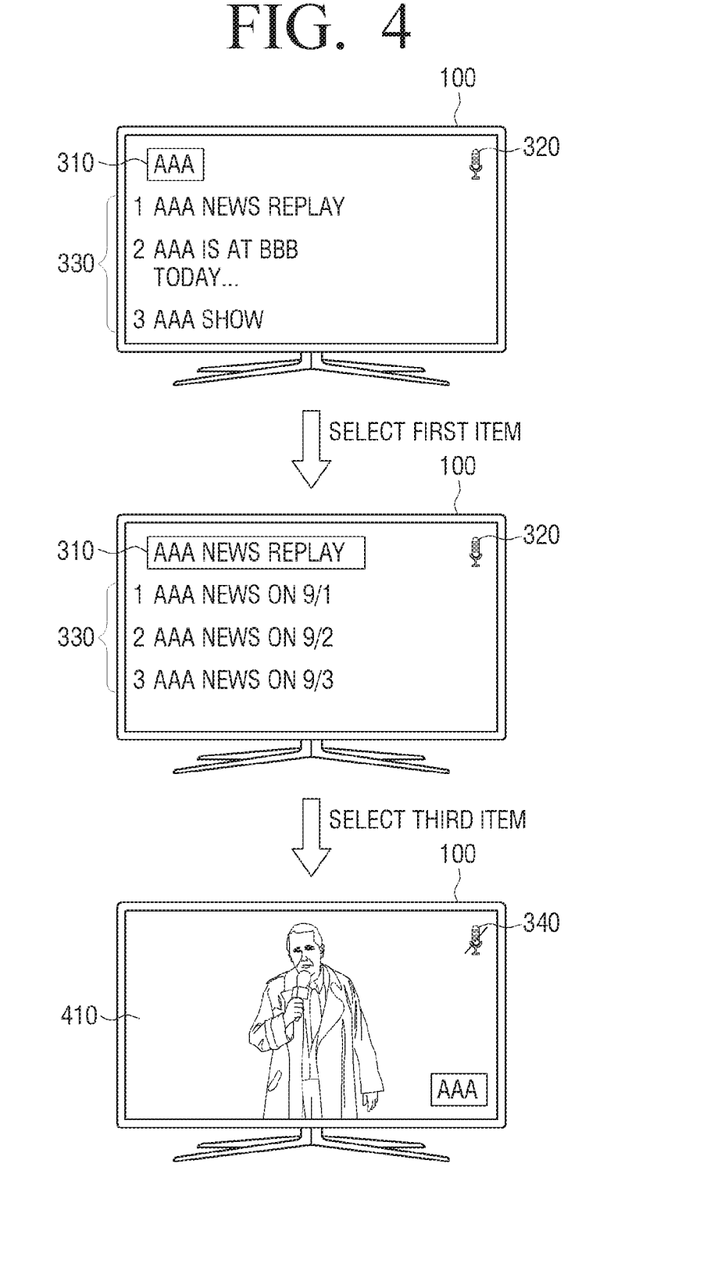
FIGS. 4 and 5 illustrate methods for determining whether or not the user's speech has finished.
Figure 5:
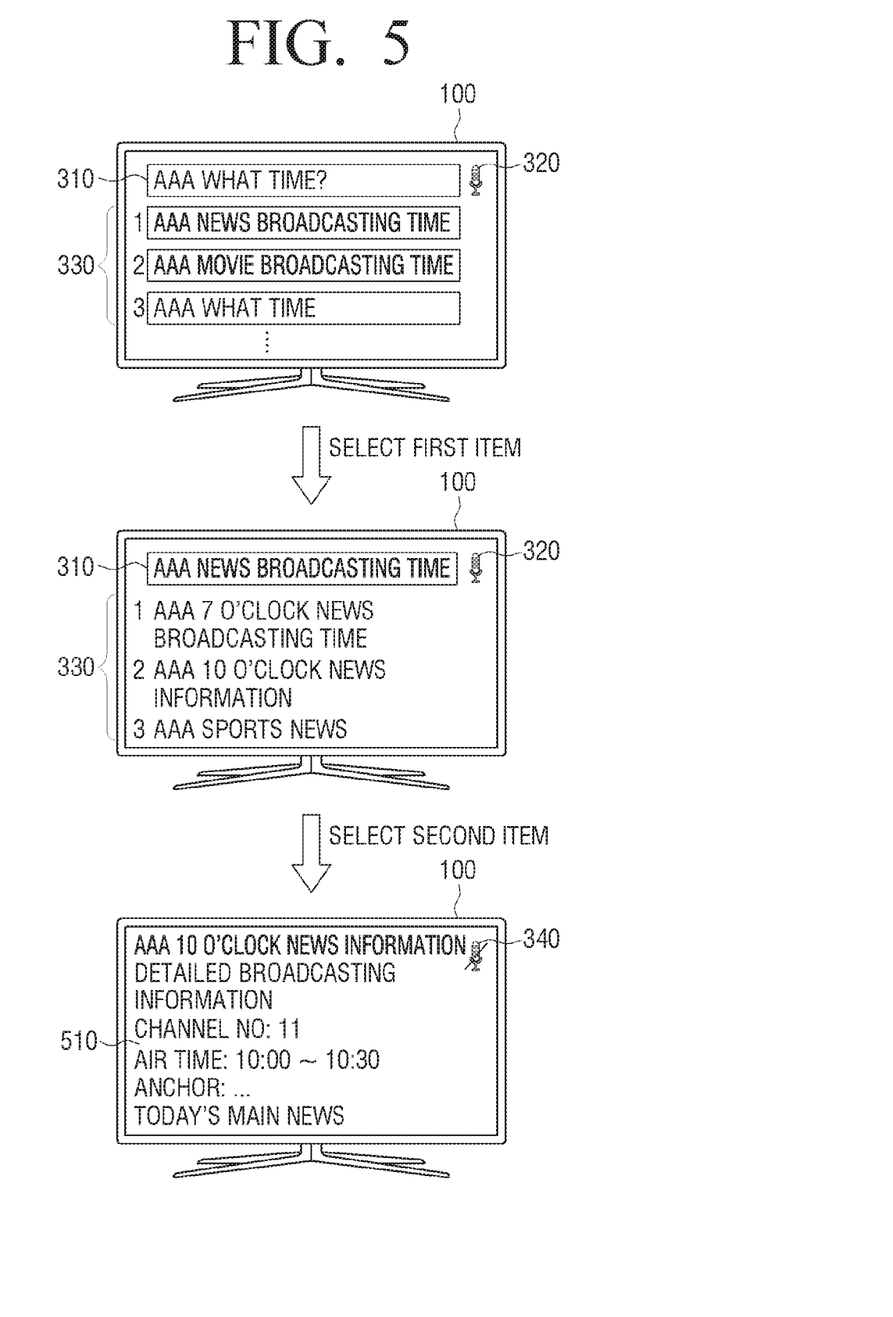

FIGS. 4 and 5 illustrate methods of determining whether or not the user's speech has finished. FIG. 4 illustrates a case where the user says a keyword, "AAA". The controller 120 may search for "AAA" and display search results in the result display area 330. In FIG. 4, a plurality of search results are displayed. Since the searched items are plural, the controller 120 may determine that the user's speech has not finished, and may reset the standby time to the initial value.

In this state, the user may select one from among the displayed items, that is, searched results by inputting a subsequent speech. In FIG. 4, the user may say an index (i.e., first, second, third . . . ) by which the search results are arranged or may say a name from the search results. In response to the user's speech, such as "first item" or "AAA NEWS REPLAY", being input, the controller 120 performs an additional search based on the input user's speech. Subsequently, the controller 120 displays "AAA NEWS REPLAY" in the text display area 310, and displays the search results for "AAA NEWS REPLAY" in the result display area 330. In this case, since a plurality of search results are searched and displayed in the list format, the controller 120 may determine that the user's speech has not finished. The controller 120 resets the standby time to the initial value again, and awaits subsequent speech.

In response to the user saying "third item" or "AAA NEWS on 9/3" as shown in FIG. 4, the controller 120 plays back multimedia contents corresponding to the item selected by the user's speech. In FIG. 4, the multimedia contents, AAA NEWS on September 3, is played back so that the playback screen 410 may be displayed. In response to a control operation executed by the user's voice or subsequent voice being multimedia contents playback operation, the controller 120 determines that the user's speech has finished.

Accordingly, the controller 120 releases the voice input mode and changes the graphic object into a form 340) which represents a release from the voice input mode. The graphic object may be deleted after a predetermined period of time from the release from the voice input mode.

In response to the contents that the user wants being output, the display apparatus 100 immediately releases the voice input mode, and does not display a user interface (UI) for the voice input mode. Accordingly, the inconvenience of the UI that may hide contents during the standby time, even when the contents is selected and output may be solved.

FIG. 5 illustrates another method for determining whether the user's speech has finished. In FIG. 5, the user says "AAA what time".

The controller 120 searches based on the user's speech, and displays search results in a list format in the result display area 330. The user may input a subsequent speech and the controller may perform an additional search in the search results. In FIG. 5, the first item and the second item are sequentially selected.

In response to information of the lowest level being selected in a hierarchical tree of information, the controller 120 may display the corresponding information. In FIG. 5, "AAA 10 O'CLOCK NEWS INFORMATION" is information related to the lowest level. When "AAA 10 O'CLOCK NEWS INFORMATION" is selected by the user's subsequent speech, the controller 120 displays a detailed information screen 510 corresponding to the selected item.

In response to the information related to the lowest level being selected, the controller 120 determines that the user's speech has finished. In other words, in response to at least one search being performed by the user's speech or subsequent speech, one of the search results being selected, and information regarding the selected search result being displayed, the controller 120 determines that the user's speech has finished. Accordingly, the controller 120 releases the voice input mode.

In response to the voice input mode being released, the controller 120 changes the graphic object 320 into another shape of graphic object 340 which represents a release from the voice input mode.

In another example, in response to an application being selected, when an application screen is displayed, and when the lowest function on the application screen is selected and executed, the controller 120 may determine that the user's speech has finished.

In FIGS. 4 and 5, the search results are displayed in a vertically arranged list, but may be provided in diverse methods according to the form and size of the display 130. For example, the search results may be horizontally displayed. In addition, the search results may be displayed in diverse forms such as captured images, thumbnail images, and icons as well as text.

As described above, the controller 120 may perform a control operation in accordance with the user's speech, and automatically determine whether the user's speech has finished, based on the contents of the user's speech and the contents of the control operation. According to the results of the determination, the controller 120 automatically releases the voice input mode, thereby preventing malfunction. In addition, the inconvenience of the UI of the voice input mode that may cover the screen may be prevented as described above. As a result, unnecessary waste of resources may be reduced.

In the above exemplary embodiments, the display apparatus 100 converts the user's voice into text, searches for the text, and understands the user's intention. However, some of these operations may be performed by an external server apparatus. In another exemplary embodiment, a voice control system including at least one server apparatus and a display apparatus may implement the aforementioned voice control method.

Figure 6:
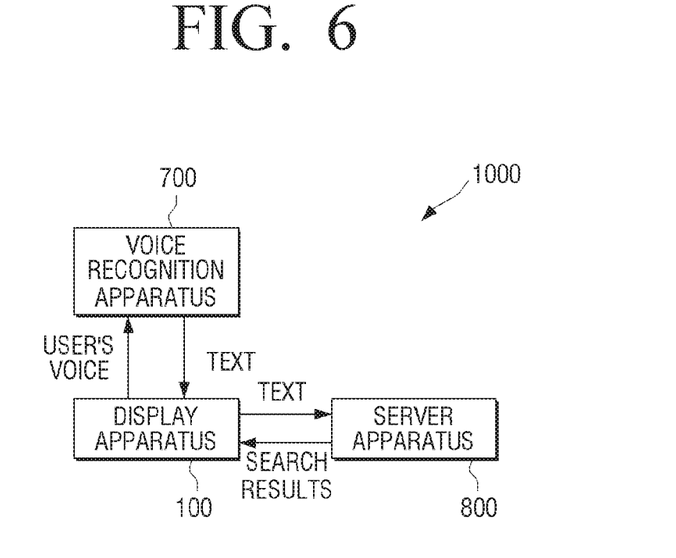
FIG. 6 illustrates a configuration of a voice control system according to an exemplary embodiment.

FIG. 6 illustrates a configuration of a voice control system according to an exemplary embodiment. With reference to FIG. 6, the voice control system 1000 may include a voice recognition apparatus 700), a server apparatus 800, and a display apparatus 100.

An interactive client module (not shown) which may be linked with the voice recognition apparatus 700 and the server apparatus 800 may be installed in the display apparatus 100. In response to the display apparatus 100 entering the voice input mode, the controller 120 runs the interactive client module and performs a control operation corresponding to an input voice. More specifically, in response to the user's voice being input, the controller 120 may transmit the user's voice to the voice recognition apparatus 700.

The voice recognition apparatus 700 is a kind of server apparatus that converts the user's voice received from the display apparatus 100 into text.

The voice recognition apparatus 700 may recognize a speech using at least one of diverse recognition algorithms such as a dynamic time warping method, a hidden Markov model, and a neural network, and convert the recognized speech into text. For example, using the hidden Markov model, the voice recognition apparatus 700 models temporal change and spectrum change of the user's speech, detects a similar word from a pre-stored language database, and outputs the detected word as text.

The display apparatus 100 receives the text from the voice recognition apparatus 700, and performs a control operation corresponding to the text. When the display apparatus 100 has a voice command corresponding to the text among the predetermined voice commands, the display apparatus 100 performs operation corresponding to the voice command. However, when the display apparatus 100 does not have any voice command corresponding to the text among the predetermined voice commands, the display apparatus 100 transmits the text to the server apparatus 800.

The server apparatus 800 searches its database or other server apparatuses for information corresponding to the text. The server apparatus 800 feeds the search results back to the display apparatus 100.

The display apparatus 100 displays the search results. The display apparatus 100 can understand the intention of the user's speech based on the search results as described above. Accordingly, when the user finishes speaking, the display apparatus 100 may automatically release the voice input mode.

In another exemplary embodiment, the server apparatus 800 may determine whether the user's speech has finished. In other words, the server apparatus 800 provides search results searched in accordance with the user's voice or subsequent voice, and in response to the user selecting information of a lower level and identifying a screen regarding the information or in response to the user selecting contents so that the selected contents are played back, the server apparatus 800 may determine that the user's speech has finished. Accordingly, the server apparatus 800 may transmit a speech finish signal to the display apparatus 100.

The display apparatus 100 receives the speech finish signal from the server apparatus 800 and releases the voice input mode.

Figure 7:
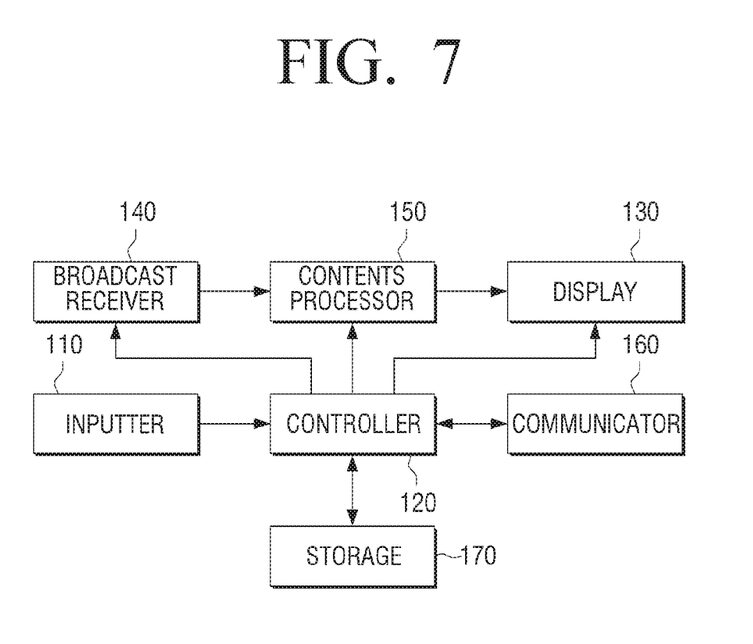
FIG. 7 is a block diagram of a configuration of a display apparatus according to another exemplary embodiment.

FIG. 7 is a block diagram of a configuration of the display apparatus 100 used in the voice input system 1000 as shown in FIG. 6. With reference to FIG. 7, the display apparatus 100 may include a voice receiver 110, e.g., an inputter, a controller 120, a display 130, a broadcast receiver 140, a contents processor 150, a communicator 160, and a storage 170.

The voice receiver 110 receives the user's voice as described above. The controller 120 performs a control operation corresponding to the user's voice input through the voice receiver 110. Since the operations of the voice receiver 110 and the controller 120 have been described in detail, the description is not repeated herein.

The broadcast receiver 140 tunes in to a broadcast channel and receives contents over the broadcast channel. In response to the user selecting a TV channel, the controller 120 controls the broadcast receiver 140 to tune to the selected TV channel.

When the broadcast receiver 140 receives a broadcast signal over the selected TV channel, the contents processor 150 processes the received broadcast signal and outputs the processed broadcast signal through the display 130 and a speaker (not shown). For example, when the ATSC standard is adopted, the broadcast receiver 140 may include an antenna, a radio frequency (RF) down converter, a demodulator, an equalizer, and the like.

The contents processor 150 processes diverse contents received through the communicator 160 as well as a broadcast signal received through the broadcast receiver 140. The contents processor 150 may include diverse signal processing units such as a demultiplexer, a video decoder, an audio decoder, and a scaler.

The communicator 160 communicates with diverse external apparatuses. More specifically, the communicator 160 may communicate with diverse external apparatuses using diverse communication methods such as a local area network (LAN), wireless fidelity (WiFi), 3G, 4G, Bluetooth, Zigbee. and near field communication (NFC).

More specifically, the communicator 160 may communicate with a voice recognition apparatus (not shown) that converts the user's voice into text, a server apparatus that searches based on text corresponding to the user's voice, and a server apparatus (not shown) that determines whether the user's speech has finished.

The storage 170 stores diverse programs and data to operate the display apparatus 100. In order for the display apparatus 100 to be linked with external server apparatuses as described above, the storage 170 may store an interactive client module. Alternatively, in response to the display apparatus 100 converting the user's voice into text, searches, and determines by itself whether the user's speech has finished, the storage 170 may store diverse programs such as a voice recognition module, a search module and a speech finish determination module.

The controller 120 may perform the voice control methods according to the diverse exemplary embodiments using the programs stored in the storage 170.

That is, in response to the voice input mode being selected using a button provided on the main body of the display apparatus 100 or using a button on a remote controller or in response to a predetermined trigger motion or a predetermined trigger speech being input, the controller 120 runs the interactive client module and enters the voice input mode. Accordingly, the controller 120 may perform a control operation in accordance with the user's voice.

When the display apparatus 100 enters the voice input mode, the controller 120 composes a graphic object, as described above, and displays the graphic object on the display 130. More specifically, the controller 120 computes a location to generate a graphic object on the screen of the display 110 using a graphic processing unit (GPU). The GPU computes a coordinate value to display the graphic object and property values such as shape, size, and color using a predetermined value. The GPU renders the graphic objet on the screen of the display 150 based on the computed property values. In response to the display apparatus 100 releasing the voice input mode, the controller 120 may change the shape of the graphic object or may delete the graphic object, as described above.

In addition, in response to the user's voice being input, the controller 120 transmits the user's voice to the voice recognition apparatus 700 through the communicator 160, and receives from the voice recognition apparatus 700 text corresponding to the user's voice.

The controller 120 transmits the received text to the server apparatus 800. Accordingly, the server apparatus 800 transmits to the display apparatus 100 results searched based on the text, and the controller 120 displays the search results on the display 130.

In this state, in response to a speech finish signal being received from the server apparatus 800, the controller 120 determines that the user's speech has finished, and releases the voice input mode.

In FIG. 6, both the voice recognition apparatus 700 and the server apparatus 800 are included in the voice control system 1000. However, a portion of them may be omitted according to the exemplary embodiment.

For example, in one exemplary embodiment in which the voice recognition apparatus 700 may be omitted, the controller 120 may perform voice conversion into text using the text conversion module stored in the storage 170. In other words, in response to the user's voice being input, the controller 120 runs the text conversion module and converts the user's voice into text by itself, instead of transmitting the user's voice to the voice recognition apparatus 700. Subsequently, the controller 120 transmits the converted text to the server apparatus 800, receives search results from the server apparatus 800, and displays the received search results.

Otherwise, in another exemplary embodiment in which the server apparatus 800 may be omitted, the controller 120 may directly perform a search using text converted by the voice recognition apparatus 700. In other words, the controller 120 runs the search module stored in the storage 170, and performs a search by inputting the text to the search module. Subsequently, the controller 120 displays the results of the search. In addition, the controller 120 may run the speech finish determination module and determine whether the user finishes speech after every search is performed. In response to determining that the user's speech has finished, the controller 120 may release the voice input mode.

In another example, the voice recognition apparatus 700 may be integrated into the server apparatus 800.

The voice control system may be implemented in diverse forms as described above. The configuration and operation of the display apparatus 100 may vary according to the form of the voice control system.

Figure 8:
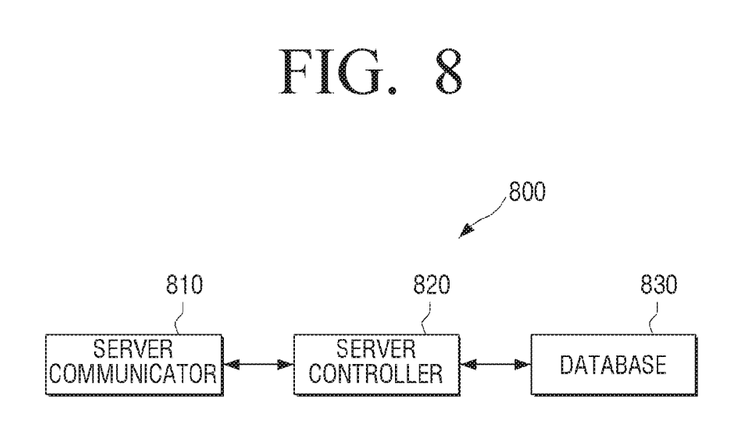
FIG. 8 is a block diagram of a configuration of a server apparatus according to an exemplary embodiment.

FIG. 8 is a block diagram of a configuration of the server apparatus 800 according to an exemplary embodiment. With reference to FIG. 8, the server apparatus 800 may include a server communicator 810, a server controller 820, and a database 830.

The server communicator 810 communicates with the display apparatus 100. The server communicator 810 may receive text corresponding to the user's voice from the display apparatus 100 operating in the voice input mode.

The database 830 may store diverse contents information. More specifically, the database 830 may store diverse information such as electronic program guide (EPG) information, recent movie information, cable broadcast program tables and website information.

The server controller 820 searches the database 830 for information including the text transmitted through the server communicator 810, and transmits the found text information to the display apparatus 100. In response to subsequent text corresponding to the user's subsequent speech being received, the server controller 820 may search again based on the subsequent text and additionally transmit the search results to the display apparatus 100.

In response to the display apparatus 100 selecting and identifying contents information, the server controller 820 may determine that additional search is not performed, and may transmit a speech finish signal to the display apparatus 100. In addition, in response to determining that information related to the lowest level or information regarding contents are provided to the display apparatus 100 by subsequent search, the server controller 820 may transmit a speech finish signal to the display apparatus 100.

As described above, the server apparatus 800 may search in accordance with the user's speech and analyze whether the user's speech has finished in line with the display apparatus 100. As a result, the display apparatus 100 may perform the aforementioned voice control methods without excessive computational burden.

Figure 9:
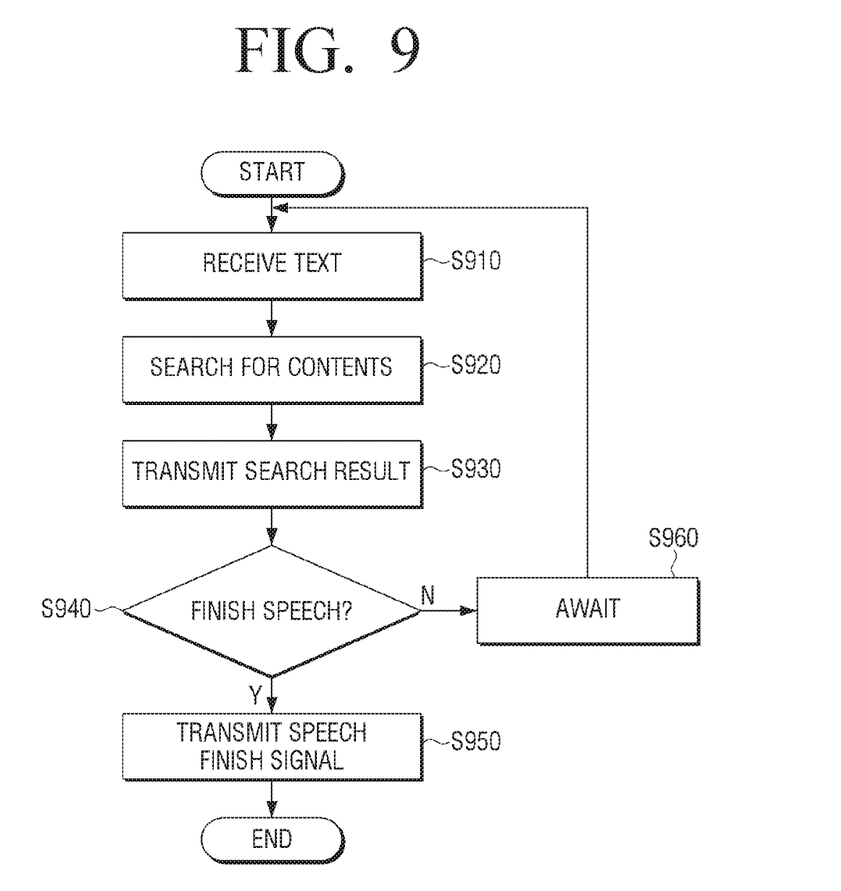
FIG. 9 is a flow chart of a voice control supporting method of a server apparatus according to an exemplary embodiment.

FIG. 9 is a flow chart of a voice control supporting method of the server apparatus 800 according to an exemplary embodiment. With reference to FIG. 9, the server apparatus 800 receives text from the display apparatus 100 (S910), and searches based on the received text (S920).

Subsequently, the server apparatus 800 transmits the search results to the display apparatus 100 (S930). Whenever the server apparatus 800 receives text, the above operations are repeated.

In response to the server apparatus 800 determining that the user's speech has finished (S940), the server apparatus 800 transmits a speech finish signal to the display apparatus 100 (S950). Accordingly, the display apparatus 100 releases the voice input mode.

In response to the server apparatus 800 determining that the user's speech has not finished, the server apparatus 800 awaits transmission of text corresponding to a subsequent speech (S960). In other words, the display apparatus 100 maintains the voice input mode.

According to the exemplary embodiments, the display apparatus 100 may release the voice input mode automatically in response to an expectation that the user's speech has finished in the voice input mode. Therefore, the screen may be prevented from being hidden by an unnecessary UI, malfunction caused by misrecognition of voice may be reduced and unnecessary waste of system resources may be reduced.

The diverse voice control methods and voice control supporting methods may be implemented with a program code, and be stored in a non-transitory computer readable storage medium. A server apparatus or a display apparatus in which such a non-transitory computer readable storage medium is embedded may run the program code and perform the aforementioned methods.

The non-transitory computer readable medium is a medium which does not store data temporarily such as a register, cash, and memory but stores data semi-permanently and is readable by devices. More specifically, the non-transitory computer readable medium may include compact disks (CDs), digital video disks (DVDs), hard disks, Blu-ray Discs™, universal serial buses (USBs), memory cards, and read-only memory (ROM).

The foregoing exemplary embodiments and advantages are merely exemplary and are not to be construed as limiting. The present teachings can be readily applied to other types of apparatuses. Also, the description of the exemplary embodiments are intended to be illustrative, and not to limit the scope of the claims, and many alternatives, modifications, and variations will be apparent to those skilled in the art.

What is claimed is:

1. An electronic apparatus comprising:
   a display;
   a voice receiver; and
   a processor configured to:
   based on a first user voice input being received through the voice receiver within a period of time set to an initial value, perform voice recognition operation and obtain information corresponding to the first user voice input,
   based on the information not including a plurality of results being obtained, control the display to display a screen corresponding to the information not including the plurality of results and release the voice recognition operation without resetting the period of time in a speech finish state that is not expected to receive a subsequent voice input,
   based on the information including the plurality of results being obtained, control the display to display a screen corresponding to the information including the plurality of results at a same time and reset the period of time to the initial value, and based on a second user voice input for selecting one of the plurality of results being received within the reset period of time while the plurality of results are displayed on the display, control the display to display a screen corresponding to the second user voice input.

2. The electronic apparatus as claimed in claim 1, wherein each of the period of time and the reset period of time is a standby time for receiving a user voice input, and wherein the period of time is the same as the reset period of time.

3. The electronic apparatus as claimed in claim 1, wherein the speech finish state includes at least one of a case for selecting the one of the plurality of results or a case for reproducing a multimedia content selected by a user.

4. The electronic apparatus as claimed in claim 1, wherein the processor is further configured to control the display to display a graphic object indicating the voice recognition operation.

5. The electronic apparatus as claimed in claim 4, wherein the processor is further configured to change a form of the graphic object indicating the voice recognition operation based on the information not including the plurality of results being obtained.

6. The electronic apparatus as claimed in claim 1, wherein the processor is further configured to, based on the information corresponding to the plurality of results being obtained, control the display to display the plurality of results and to display a graphic object indicating the voice recognition operation.

7. The electronic apparatus as claimed in claim 6, wherein the processor is further configured to change a form of the graphic object indicating the voice recognition operation based on the second user voice input for selecting the one of the plurality of results being received within the reset period of time.

8. The electronic apparatus as claimed in claim 1, wherein the processor is further configured to terminate the voice recognition operation based on the second user voice input for selecting the one of the plurality of results being received within the reset period of time.

9. The electronic apparatus as claimed in claim 1, wherein the processor is further configured to, based on the first user voice input being received, convert the first user voice input to a text and control the display to display the text corresponding to the first user voice input.

10. The electronic apparatus as claimed in claim 1, further comprising a communicator, wherein the processor is further configured to, based on the first user voice input being received through the voice receiver within the period of time, transmit a text corresponding to the first user voice input to a server and receive information corresponding to the text from the server.

11. A method of controlling an electronic apparatus, the method comprising:

based on a first user voice input being received within a period of time set to an initial value, performing voice recognition operation and obtaining information corresponding to the first user voice input;

based on the information not including a plurality of results being obtained, displaying a screen corresponding to the information not including the plurality of results on a display and releasing the voice recognition operation without resetting the period of time in a speech finish state that is not expected to receive a subsequent voice input;

based on the information including the plurality of results being obtained, displaying a screen corresponding to the information including the plurality of results on the display at a same time and resetting the period of time to the initial value; and based on a second user voice input for selecting one of the plurality of results being received within the reset period of time while the plurality of results are displayed on the display, displaying a screen corresponding to the second user voice input on the display.

12. The method as claimed in claim 11, wherein each of the period of time and the reset period of time is a standby time for receiving a user voice input, and wherein the period of time is the same as the reset period of time.

13. The method as claimed in claim 11, wherein the speech finish state includes at least one of a case for selecting the one of the plurality of results or a case for reproducing a multimedia content selected by a user.

14. The method as claimed in claim 11, further comprising displaying a graphic object indicating the voice recognition operation on the display.

15. The method as claimed in claim 14, further comprising changing a form of the graphic object indicating the voice recognition operation based on the information not including the plurality of results being obtained.

16. The method as claimed in claim 11, further comprising, based on the information corresponding to the plurality of results being obtained, displaying, on the display, the plurality of results and a graphic object indicating the voice recognition operation.

17. The method as claimed in claim 16, further comprising changing a form of the graphic object indicating the voice recognition operation based on the second user voice input for selecting the one of the plurality of results being received within the reset period of time.

18. The method as claimed in claim 11, further comprising terminating the voice recognition operation based on the second user voice input for selecting the one of the plurality of results being received within the reset period of time.

19. The method as claimed in claim 11, further comprising, based on the first user voice input being received, converting the first user voice input to a text and displaying the text corresponding to the first user voice input.

20. The method as claimed in claim 11, further comprising, based on the first user voice input being received within the period of time, transmitting a text corresponding to the first user voice input to a server via a communicator and receiving information corresponding to the text from the server via the communicator.

21. A non-transitory computer readable recording medium storing a program which is executable by a processor to execute a method of controlling an electronic apparatus, the method comprising:

based on a first user voice input being received within a period of time set to an initial value, performing voice recognition operation and obtaining information corresponding to the first user voice input, based on the information not including a plurality of results being obtained, displaying a screen corresponding to the information not including the plurality of results on a display and releasing the voice recognition operation without resetting the period of time in a speech finish state that is not expected to receive a subsequent voice input, based on the information including the a plurality of results being obtained, displaying a screen corresponding to the information including the plurality of results on the display at a same time and resetting the period of time to the initial value, and based on a second user voice input for selecting one of the plurality of results being received within the reset period of time while the plurality of results are displayed on the display, displaying a screen corresponding to the second user voice input on the display.

22. The non-transitory computer readable recording medium as claimed in claim 21, wherein each of the period of time and the reset period of time is a standby time for receiving a user voice input, and wherein the period of time is the same as the reset period of time.

* * * * *